United States Patent
Hosoda

(10) Patent No.: US 10,714,994 B2
(45) Date of Patent: Jul. 14, 2020

(54) ROTOR AND ROTARY ELECTRIC MACHINE

(71) Applicant: FANUC CORPORATION, Yamanashi (JP)

(72) Inventor: Akihiro Hosoda, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 29 days.

(21) Appl. No.: 16/190,360

(22) Filed: Nov. 14, 2018

(65) Prior Publication Data

US 2019/0149000 A1    May 16, 2019

(30) Foreign Application Priority Data

Nov. 15, 2017   (JP) .................................. 2017-219654

(51) Int. Cl.
*H02K 1/27*    (2006.01)
*H02K 21/16*    (2006.01)
*H02K 29/03*    (2006.01)

(52) U.S. Cl.
CPC ........... *H02K 1/2766* (2013.01); *H02K 21/16* (2013.01); *H02K 29/03* (2013.01); *H02K 2213/03* (2013.01)

(58) Field of Classification Search
CPC .. H02K 1/2766; H02K 21/16; H02K 2213/03; H02K 29/03; H02K 1/276;
(Continued)

(56) References Cited

U.S. PATENT DOCUMENTS

| 6,774,523 B2 * | 8/2004 | Ahn ..................... H02K 1/2766 310/156.01 |
| 7,612,480 B2 * | 11/2009 | Fujii .................... H02K 1/2766 310/156.53 |

(Continued)

FOREIGN PATENT DOCUMENTS

| JP | 2004-180460 A | 6/2004 |
| JP | 3659055 B2 | 6/2005 |

(Continued)

OTHER PUBLICATIONS

Decision to Grant a Patent issued by the Japanese Patent Office in relation to Japanese Application No. 2017-219654 dated Sep. 17, 2019 (3 pages) along with English language translation (2 pages).

*Primary Examiner* — Tulsidas C Patel
*Assistant Examiner* — Ahmed Elnakib
(74) *Attorney, Agent, or Firm* — Robert P. Michal, Esq.; Carter, DeLuca & Farrell LLP

(57) ABSTRACT

A rotor includes a first slot, a second slot, a first flux barrier, and a second flux barrier. As viewed in a direction of the rotation axis of a rotor core, the substantially rectangular first and second slots are provided in a V-shape pattern. As viewed in the rotation axis direction of the rotor core, the first flux barrier is provided between first and second contact parts, and protrudes toward the outer circumference side from the outer circumferential short side of each of the first and second slots. As viewed in the rotation axis of the rotor core, an outer circumferential wall of the second flux barrier is continuous with the first contact part, and the second flux barrier protrudes from an inner long side of each of the first and second slots.

8 Claims, 7 Drawing Sheets

(58) Field of Classification Search
CPC ........ H02K 1/2773; H02K 15/03; H02K 1/22;
H02K 1/27; Y10T 29/49012
USPC ............ 310/156.07, 156.08, 156.83, 156.53,
310/156.56, 156.57, 156.43, 156.38
See application file for complete search history.

(56) References Cited

U.S. PATENT DOCUMENTS

| | | | | |
|---|---|---|---|---|
| 10,186,918 | B2* | 1/2019 | Kim | H02K 1/2773 |
| 10,505,417 | B2* | 12/2019 | Hosoda | H02K 1/2766 |
| 2004/0178693 | A1* | 9/2004 | Burgbacher | H02K 1/276 |
| | | | | 310/216.064 |
| 2006/0119299 | A1 | 6/2006 | Nishijima | |
| 2012/0293033 | A1* | 11/2012 | Hisada | H02K 1/2766 |
| | | | | 310/156.43 |
| 2013/0119807 | A1* | 5/2013 | Nakada | H02K 1/2706 |
| | | | | 310/156.38 |
| 2013/0154425 | A1 | 6/2013 | Nakada | |
| 2014/0077653 | A1* | 3/2014 | Takahashi | H02K 1/2766 |
| | | | | 310/156.53 |
| 2015/0236556 | A1 | 8/2015 | Suwazono et al. | |
| 2016/0028278 | A1* | 1/2016 | Baba | H02K 1/276 |
| | | | | 310/156.08 |
| 2017/0155294 | A1 | 6/2017 | Chiu | |
| 2017/0163107 | A1 | 6/2017 | Oketani | |
| 2018/0309335 | A1* | 10/2018 | Hosoda | H02K 1/28 |
| 2018/0375394 | A1* | 12/2018 | Hosoda | H02K 1/28 |
| 2019/0148997 | A1* | 5/2019 | Hosoda | H02K 1/146 |
| | | | | 310/216.008 |
| 2019/0149000 | A1* | 5/2019 | Hosoda | H02K 1/2766 |
| | | | | 310/156.07 |

FOREIGN PATENT DOCUMENTS

| | | |
|---|---|---|
| JP | 2012-029524 A | 2/2012 |
| JP | 2012227993 A | 11/2012 |
| JP | 2012-244765 A | 12/2012 |
| JP | 2013162617 A | 8/2013 |
| JP | 2014-060835 A | 4/2014 |
| JP | 5516739 | 4/2014 |
| JP | 2014212589 A | 11/2014 |
| JP | 5696820 | 2/2015 |
| JP | 2017-050965 A | 3/2017 |
| WO | WO-2012/014834 | 2/2012 |
| WO | 2013077109 A1 | 5/2013 |
| WO | WO 2013168295 * | 11/2013 |
| WO | WO-2016/027338 | 2/2016 |
| WO | 2017105147 A1 | 6/2017 |

* cited by examiner

FIG. 4

| ANALYSIS MODEL | MODEL C (OUTER END) | MODEL D (SHIFTED TO THE OUTSIDE) | MODEL E (CENTER) | MODEL F (INNER END) | MODEL G (TWO) |
|---|---|---|---|---|---|
| COGGING TORQUE | 10 | 1 | 7 | 15 | 13 |
| TORQUE REDUCTION AMOUNT | 1.1 | 1.6 | 1.8 | 2.4 | 1 |
| STRESS CONCENTRATION VALUE | 4 | 1.2 | 1.4 | 2 | 1.5 |

ROTOR AND ROTARY ELECTRIC MACHINE

CROSS-REFERENCE TO RELATED APPLICATION

This application is based upon and claims the benefit of priority from Japanese Patent Application No. 2017-219654 filed on Nov. 15, 2017, the contents of which are incorporated herein by reference.

BACKGROUND OF THE INVENTION

Field of the Invention

The present invention relates to a rotor of an embedded magnet type, and a rotary electric machine having the rotor of the embedded magnet type.

Description of the Related Art

According to the disclosure of International Publication No. WO 2012/014834, a slot having a V-shape is formed in a rotor, and a pair of permanent magnets are inserted into the slot. Gaps are provided in the outer circumferential side and the inner circumferential side of the permanent magnets.

SUMMARY OF THE INVENTION

By providing the gaps on the outer circumferential side of the permanent magnets, it is possible to reduce the cogging torque generated in the rotary electric machine. However, in the technique of International Publication No. WO 2012/014834, the cogging torque involves variation due to production errors of the permanent magnets disadvantageously.

The present invention has been made taking the above problem into account, and an object of the present invention is to provide a rotor and a rotary electric machine which makes it possible to reduce the cogging torque generated in the rotary electric machine, and reduce variation in the cogging torque in each product.

A rotor according to a first aspect of the present invention includes a rotor including: a rotor core configured to rotate together with a rotor shaft; a first slot and a second slot penetrating through the rotor core, in a direction of a rotation axis of the rotor core, and as viewed in the direction of the rotation axis of the rotor core, the first slot and the second slot each having a substantially rectangular shape, and provided in a V-shape pattern in a manner that outer circumferential sides of the first slot and the second slot are positioned remotely from each other, and inner circumferential sides of the first slot and the second slot are positioned closely to each other; a first permanent magnet and a second permanent magnet, as viewed in the direction of the rotation axis of the rotor core, the first permanent magnet and the second permanent magnet each having a substantially rectangular shape, the first permanent magnet being inserted into the first slot, and the second permanent magnet being inserted into the second slot; a first contact part, as viewed in the direction of the rotation axis of the rotor core, the first contact part being formed in an outer circumferential short side of each of the first slot and the second slot, and formed inside each of the first slot and the second slot, to contact each of the first permanent magnet and the second permanent magnet; a second contact part, as viewed in the direction of the rotation axis of the rotor core, the second contact part being formed in the outer circumferential short side of each of the first slot and the second slot, and formed outside each of the first slot and the second slot, to contact each of the first permanent magnet and the second permanent magnet; a first flux barrier, as viewed in the direction of the rotation axis of the rotor core, the first flux barrier being provided between the first contact part and the second contact part, and the first flux barrier being formed in the outer circumferential short side of each of the first slot and the second slot, to protrude toward an outer circumferential side; and a second flux barrier, as viewed in the direction of the rotation axis of the rotor core, an outer circumferential wall of the second flux barrier being continuous with the first contact part, and the second flux barrier being formed to protrude from an inner long side of each of the first slot and the second slot.

A rotary electric machine according to a second aspect of the present invention includes a rotor, and the rotor includes: a rotor core configured to rotate together with a rotor shaft; a first slot and a second slot penetrating through the rotor core, in a direction of a rotation axis of the rotor core, and as viewed in the direction of the rotation axis of the rotor core, the first slot and the second slot each having a substantially rectangular shape, and provided in a V-shape pattern in a manner that outer circumferential sides of the first slot and the second slot are positioned remotely from each other, and inner circumferential sides of the first slot and the second slot are positioned closely to each other; a first permanent magnet and a second permanent magnet, as viewed in the direction of the rotation axis of the rotor core, the first permanent magnet and the second permanent magnet each having a substantially rectangular shape, the first permanent magnet being inserted into the first slot, and the second permanent magnet being inserted into the second slot; a first contact part, as viewed in the direction of the rotation axis of the rotor core, the first contact part being formed in an outer circumferential short side of each of the first slot and the second slot, and formed inside each of the first slot and the second slot, to contact each of the first permanent magnet and the second permanent magnet; a second contact part, as viewed in the direction of the rotation axis of the rotor core, the second contact part being formed in the outer circumferential short side of each of the first slot and the second slot, and formed outside each of the first slot and the second slot, to contact each of the first permanent magnet and the second permanent magnet; a first flux barrier, as viewed in the direction of the rotation axis of the rotor core, the first flux barrier being provided between the first contact part and the second contact part, and the first flux barrier being formed in the outer circumferential short side of each of the first slot and the second slot, to protrude toward an outer circumferential side; and a second flux barrier, as viewed in the direction of the rotation axis of the rotor core, an outer circumferential wall of the second flux barrier being continuous with the first contact part, and the second flux barrier being formed to protrude from an inner long side of each of the first slot and the second slot.

In the present invention, it is possible to reduce the cogging torque generated in the rotary electric machine, and suppress variation in the cogging torque in each product.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 4 is a table showing results of simulation when the layout and the number of the first flux barriers are changed;

DESCRIPTION OF THE PREFERRED EMBODIMENTS

First Embodiment

Structure of Rotary Electric Machine

Figure 1:
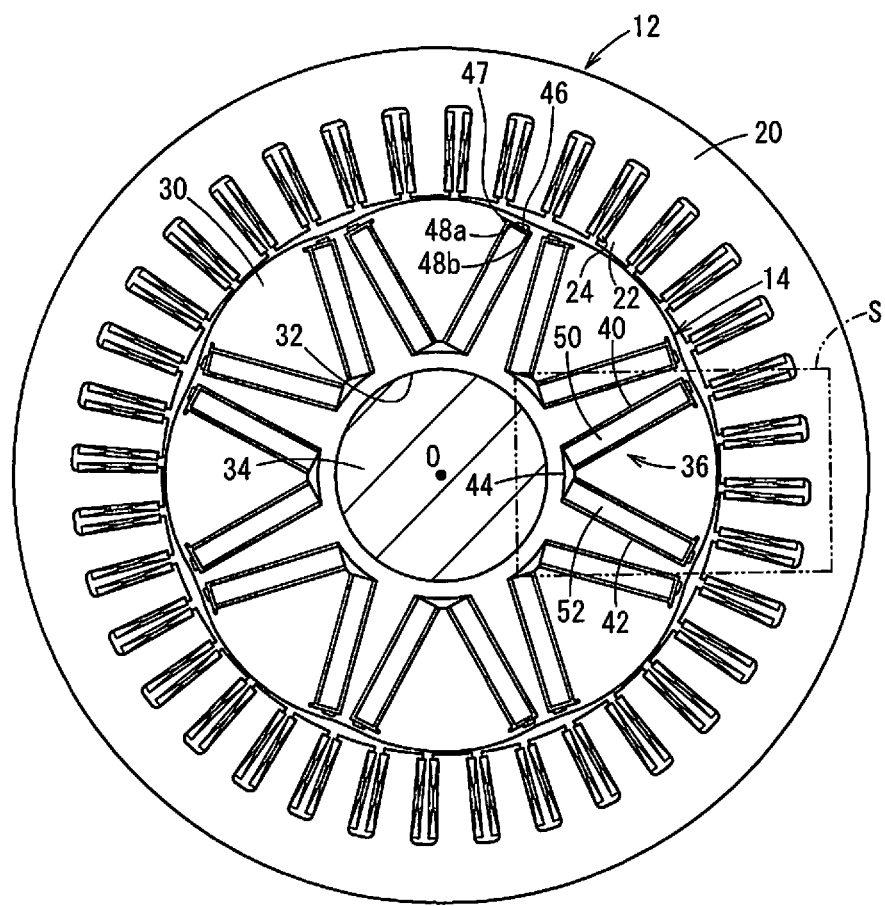
FIG. 1 is a view schematically showing structure of a rotary electric machine.
Figure 2:
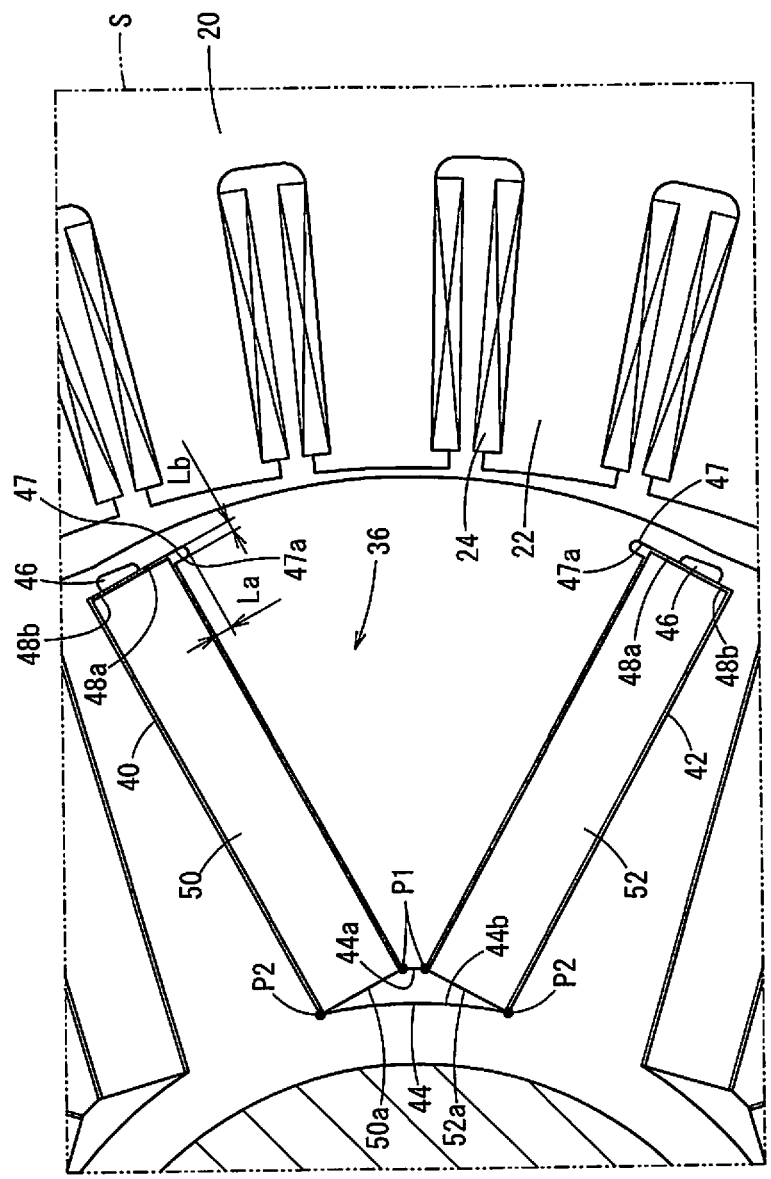
FIG. 2 is an enlarged view showing an area of a rectangular frame in FIG. 1.

FIG. 1 is a view schematically showing structure of a rotary electric machine 10. FIG. 2 is an enlarged view showing an area of a rectangular frame S in FIG. 1. The rotary electric machine 10 includes a stator 12 having 36 slots, and a rotor 14 having 8 poles. The stator 12 has a substantially cylindrical stator core 20 made of iron based metal. The stator core 20 includes a plurality of teeth 22 in a circumferential direction. The teeth 22 protrude toward the inner circumferential side. A coil 24 is wound around each of the teeth 22.

The rotor 14 includes a substantially cylindrical rotor core 30. The rotor core 30 is a stacked steel plate formed by stacking a plurality of thin steel plates in a direction of the rotation axis O of the rotor core 30. The rotor core 30 has a shaft insertion hole 32 passing through the rotation axis O of the rotor core 30. A rotor shaft 34 is inserted into the shaft insertion hole 32 by shrink fitting. In the structure, the rotor core 30 rotates together with the rotor shaft 34. The rotor core 30 includes a plurality of slots 36 in the circumferential direction. The slots 36 pass through the rotor core 30 in the direction of the rotation axis O of the rotor core 30.

Slots 36 include a first slot 40, a second slot 42, a communication part 44, a first flux barrier 46, and a second flux barrier 47. As viewed in the direction of the rotation axis O of the rotor core 30, each of the first slot 40 and the second slot 42 has a substantially rectangular shape. As viewed in the direction of the rotation axis O of the rotor core 30, the first slot 40 and the second slot 42 are provided in a V-shape pattern in a manner that outer circumferential sides of the first slot 40 and the second slot 42 are positioned remotely from each other, and inner circumferential sides of the first slot 40 and the second slot 42 are positioned closely to each other.

The first flux barrier 46 is formed in each of the first slot 40 and the second slot 42. As viewed in the direction of the rotation axis O of the rotor core 30, the first flux barrier 46 protrudes from the outer circumferential short side of each of the first slot 40 and the second slot 42. As viewed in the direction of the rotation axis O of the rotor core 30, the first flux barrier 46 is formed in an intermediate portion of the outer circumferential short side of each of the first slot 40 and the second slot 42, at a position shifted toward the outside of the slot 36. Therefore, as viewed in the direction of the rotation axis O of the rotor core 30, each of the short sides on the outer circumferential side of the first slot 40 and the second slot 42 is divided into a first contact part 48a and a second contact part 48b, and the length of the first contact part 48a is larger than the length of the second contact part 48b. It should be noted that the first contact part 48a is formed inside the slot 36, and the second contact part 48b is formed outside the slot 36.

The second flux barrier 47 is formed in each of the first slot 40 and the second slot 42. The second flux barrier 47 protrudes from the inner long side of each of the first slot 40 and the second slot 42. As viewed in the direction of the rotation axis O of the rotor core 30, an outer circumferential wall 47a of the second flux barrier 47 is continuous with the first contact part 48a. The length La of the second flux barrier 47 in the direction in which the second flux barrier 47 protrudes from each of the first slot 40 and the second slot 42 is larger than the length Lb of the second flux barrier 47 in the width direction.

The communication part 44 is formed on the inner circumferential side of the first slot 40 and the second slot 42. As viewed in the direction of the rotation axis O of the rotor core 30, the communication part 44 has a substantially isosceles trapezoidal shape formed by connecting end points P1, P1 of the inner circumferential short sides of the first slot 40 and the second slot 42 that are closer to each other, and connecting end points P2, P2 of the inner circumferential short sides of the first slot 40 and the second slot 42 that are remoter from each other.

A first permanent magnet 50 is inserted into the first slot 40, and a second permanent magnet 52 is inserted into the second slot 42. In the structure, the first permanent magnet 50 and the second permanent magnet 52 are provided in a V-shape pattern. At this time, the pole on the inner side of the first permanent magnet 50 and the pole on the inner side of the second permanent magnet 52 have the same polarity.

As viewed in the direction of the rotation axis O of the rotor core 30, each of the first permanent magnet 50 and the second permanent magnet 52 has a substantially rectangular shape, and has the substantially the same shape as the first slot 40 and the second slot 42.

The outer circumferential side of the first permanent magnet 50 and the outer circumferential side of the second permanent magnet 52 contact the first contact part 48a and the second contact part 48b of the outer circumferential short side of the first slot 40 and the first contact part 48a and the second contact part 48b of the outer circumferential short side of the second slot 42, respectively. The inner circumferential side of the first permanent magnet 50 and the inner circumferential side of the second permanent magnet 52 contact the end points P2 of the communication part 44. Thus, the first permanent magnet 50 and the second permanent magnet 52 are positioned with respect to the first slot 40 and the second slot 42. In this state, the inner circumferential short side of the first permanent magnet 50 and the inner circumferential short side of the second permanent magnet 52 are substantially aligned with the inner circumferential short side of the first slot 40 and the inner circumferential short side of the second slot 42, respectively.

Resin is filled between the first slot 40, the second slot 42, the communication part 44, and the first flux barrier 46, the second flux barrier 47, and the first permanent magnet 50 and the second permanent magnet 52. The first permanent magnet 50 and the second permanent magnet 52 are fixed in the first slot 40 and the second slot 42, respectively.

As viewed in the direction of the rotation axis O of the rotor core 30, a substantially isosceles trapezoidal shape is formed by a side surface 44a connecting the end points P1, P1 of the communication part 44, a side surface 44b connecting the end points P2, P2, and inner circumferential short sides 50a, 52a of the first permanent magnet 50 and the second permanent magnet 52. As viewed in the direction of the rotation axis O of the rotor core 30, each of the side surfaces 44a and the side surface 44b may have a straight shape or a circular arc shape around the rotation axis O.

Since the communication part 44 and the first flux barrier 46 are present, some parts of the short sides of the first permanent magnet 50 and the second permanent magnet 52 do not directly contact the rotor core 30. Thus, it is possible to suppress leakage of the magnetic flux from the short sides of the first permanent magnet 50 and the second permanent magnet 52, and it is possible to suppress reduction in the torque of the rotary electric machine 10.

Results of Simulation

Figure 3:
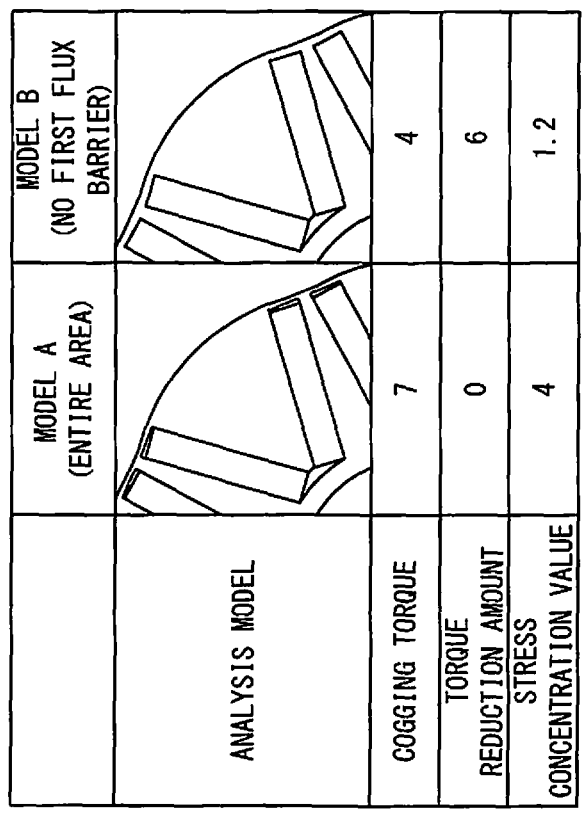
FIG. 3 is a table showing results of simulation depending on the presence/absence of a first flux barrier.

FIG. 3 is a table showing results of simulation depending on the presence/absence of the first flux barrier 46. Based on simulation, the inventor of the present application calculated the cogging torque generated in the rotary electric machine 10, the torque reduction amount due to leakage of the magnetic flux from the first permanent magnet 50 and the second permanent magnet 52, and the stress concentration value of stress applied in the vicinity of the outer circumferential short sides of the first slot 40 and the second slot 42 (including the first flux barrier 46). Numeric values in the table are evaluation values. As the value gets smaller, the cogging torque, the torque reduction amount, or the stress concentration value gets smaller, i.e., the value gets better.

As described above, by providing the first flux barrier 46, it is possible to suppress leakage of the magnetic flux from the short sides of the first permanent magnet 50 and the second permanent magnet 52, and suppress reduction in the torque of the rotary electric machine 10. However, based on simulation, it was proven that, when the first flux barrier 46 is provided, as indicated by the model A of FIG. 3, the stress concentration value of the stress becomes high in the vicinity of the outer circumferential short sides of the first slot 40 and the second slot 42.

In the embodiment of the present invention, the inner circumferential side of the first slot 40 and the inner circumferential side of the second slot 42 are connected to the communication part 44. That is, the inner circumferential short sides of the first slot 40 and the second slot 42 are opened. Therefore, in comparison with the structure where the inner circumferential short sides of the first slot 40 and the second slot 42 are closed by steel plates, the strength in the vicinity of the outer circumferential short sides of the first slot 40 and the second slot 42 is small. Thus, it is desired to reduce the stress concentration value in the outer circumferential short sides of the first slot 40 and the second slot 42.

Further, the inventor of the present application conducted simulation by changing the layout and the number of the first flux barriers 46. FIG. 4 is a table showing results of simulation where the layout and the number of the first flux barriers 46 were changed.

FIG. 4 shows the result of simulations of the following five models. The five models herein include a model C where the first flux barrier 46 is provided on the outer circumferential short side of each of the first slot 40 and the second slot 42, at an end on the outer side the slot 36 (at an outer end of the slot 36), a model D where the first flux barrier 46 is provided in an intermediate portion on the outer circumferential short side of each of the first slot 40 and the second slot 42, at a position shifted toward the outside of the slot 36 (at an outer position of the slot 36), a model E where the first flux barrier 46 is provided at the central position (center) on the outer circumferential short side of each of the first slot 40 and the second slot 42, a model F where the first flux barrier 46 is provided on the outer circumferential short side of each of the first slot 40 and the second slot 42, and at an end on the inner side of the slot 36 (an inner end of the slot 36), and a model G where two first flux barriers 46 are provided. It should be noted that the model D shows the layout of the first flux barrier 46 according to the embodiment of the present invention.

Based on the results of simulation shown in FIG. 4, in the embodiment of the present invention, as for the layout of the first flux barrier 46, the model D having the smallest stress concentration value among all of the models was adopted. By adopting the model D, it is possible to reduce the stress concentration value in comparison with other models having the first flux barriers 46. Further, since the cogging torque of the model D is smaller than those of the other models, it is possible to enable the rotary electric machine 10 to rotate smoothly. It is also suitable to adopt the model E having the second smallest stress concentration value next to the model D, and having a relatively small cogging torque and a relative small torque reduction amount in comparison with the other models.

In the above models A to G, corners of the first permanent magnet 50 and the second permanent magnet 52 are not chamfered. However, at the time of producing the first permanent magnet 50 and the second permanent magnet 52, corners of the first permanent magnet 50 and the second permanent magnet 52 are chamfered. Additionally, the inventor of the present invention conducted simulation by changing the sizes of the chamfered portions of the first permanent magnet 50 and the second permanent magnet 52, in order to verify the influence of the chamfered corners of the first permanent magnet 50 and the second permanent magnet 52.

Figure 5:
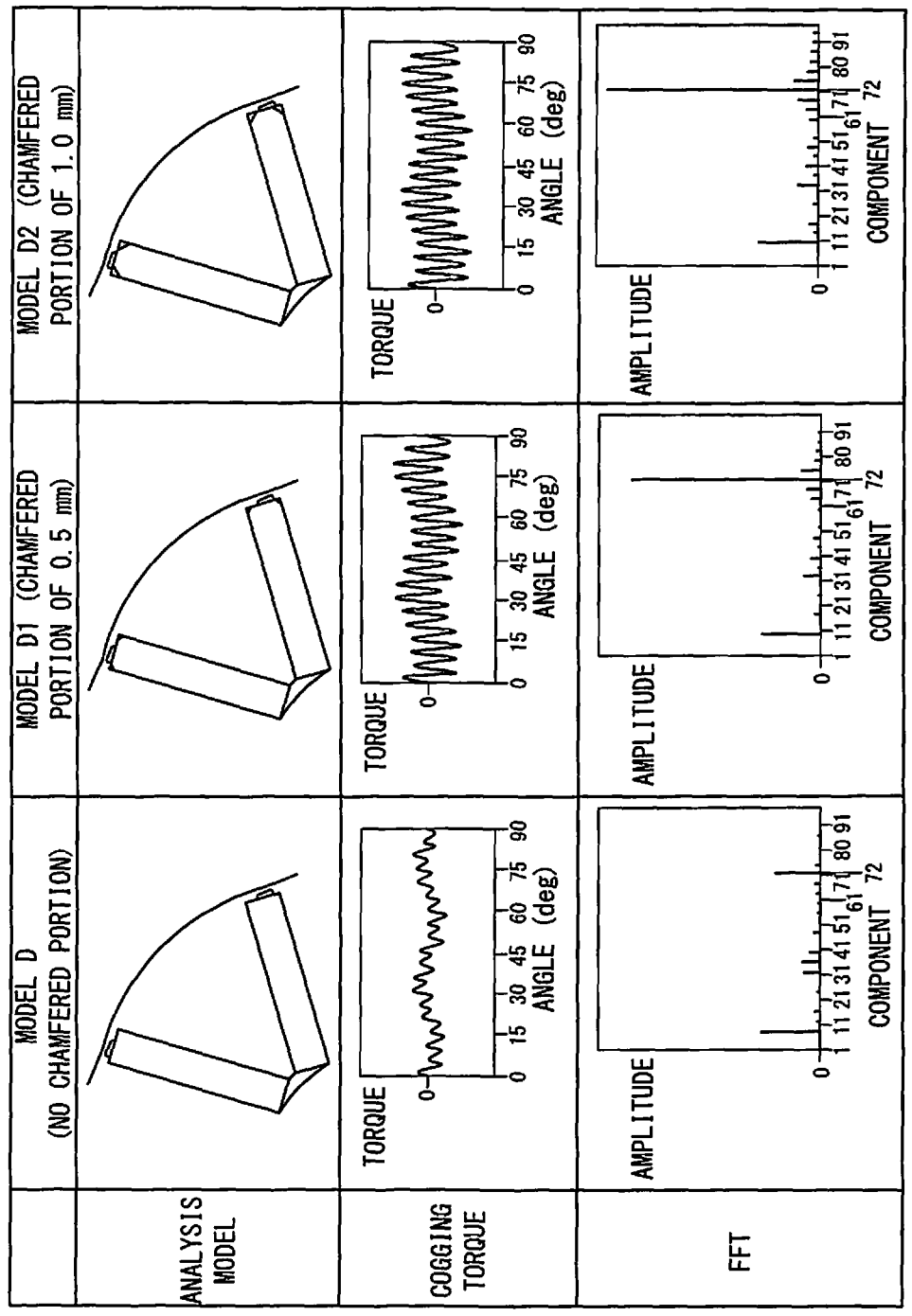
FIG. 5 is a table showing results of simulation when the sizes of chamfered portions of a first permanent magnet and a second permanent magnet are changed.

FIG. 5 is a table showing results of simulation where the sizes of chamfered portions of the first permanent magnet 50 and the second permanent magnet 52 were changed. In FIG. 5, the results of simulation of the following three models are shown. Three models herein include the above model D, a model D1 including a chamfered portion of 0.5 [mm] in each of the first permanent magnet 50 and the second permanent magnet 52, and the model D2 including a chamfered portion of 1.0 [mm] in each of the first permanent magnet 50 and the second permanent magnet 52. It should be noted that, in the model D, the first permanent magnet 50 and the second permanent magnet 52 are not chamfered. The results of simulation in FIG. 5 are obtained by fast Fourier transform (FFT) of the change of cogging torque generated in the rotary electric machine 10 when the rotor 14 is rotated up to 90[°] where the rotation angle at a predetermined rotation position of the rotor 14 is 0[°], and the change of the cogging torque.

As can be seen from FIG. 5, in the models D1 and D2 including the chamfered portion, in comparison with the model D which does not include any chamfered portion, the cogging torque is large, and in particular, the component of 72nd order is large. The number 72 is twice as large as the number (36) of slots in the stator 12. It is difficult to manage the sizes of the chamfer portions of the first permanent magnet 50 and the second permanent magnet 52 with a high degree of accuracy. Based on the results of the simulation, it can be seen that variation in the cogging torque generated in each product of the rotary electric machine 10 becomes large due to production errors in the first permanent magnet 50 and the second permanent magnet 52.

Figure 6:
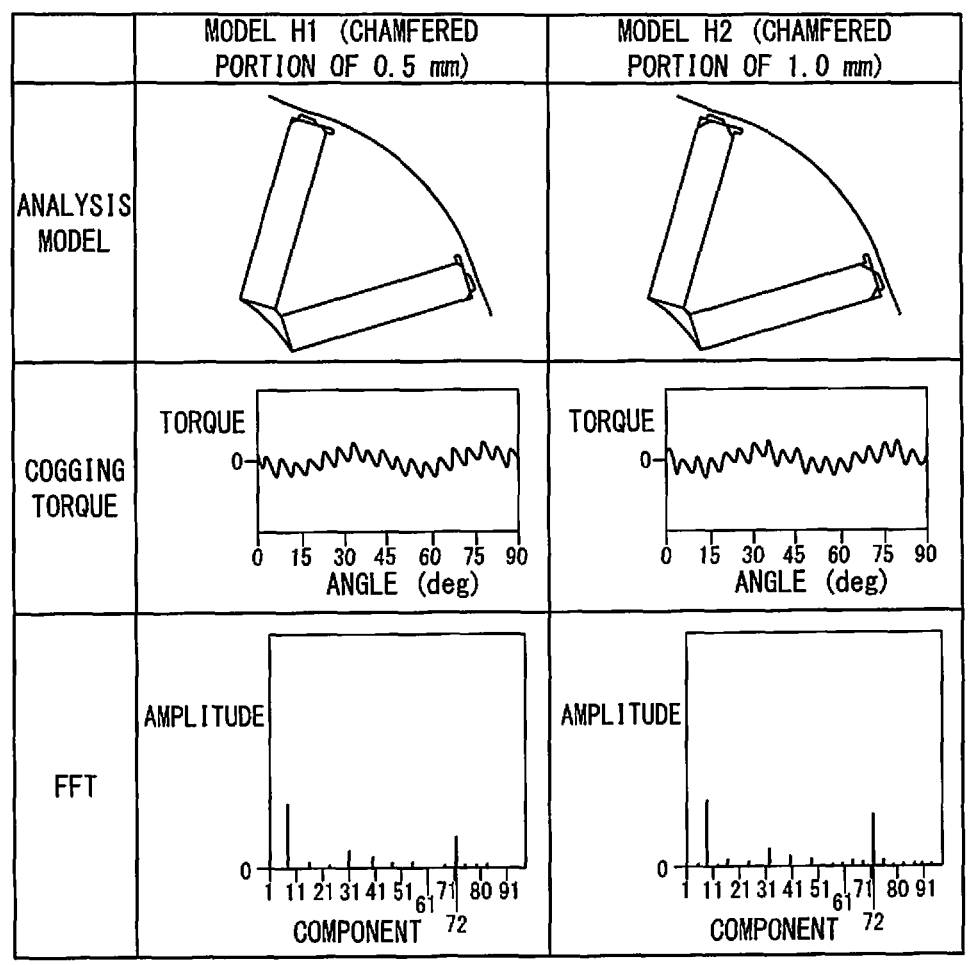
FIG. 6 is a table showing results of simulation when a second flux barrier is added.

FIG. 6 shows results of simulation of two models H1, H2 including an additional second flux barrier 47 in the models D1, D2 of FIG. 5, respectively. In the model H1, each of the first permanent magnet 50 and the second permanent magnet 52 includes a chamfered portion of 0.5 [mm]. In the model H2, each of the first permanent magnet 50 and the second permanent magnet 52 includes a chamfered portion of 1.0 [mm].

As can be seen from FIG. 6, in both of the model H1 and the model H2, the cogging torque is small in comparison with the models D1, D2 of FIG. 5. In particular, the component of the 72nd order is small. By providing the second flux barrier 47 in the model D additionally, it is possible to reduce variation in the cogging torque generated in the rotary electric machine 10 of each product, due to the production errors in the first permanent magnet 50 and the second permanent magnet 52.

Working Effects and Advantages

By providing the first flux barrier 46 on the outer circumferential short side in each of the first slot 40 and the second slot 42, in comparison with the case where the first flux barrier 46 is not provided, it is possible to reduce the cogging torque. However, it was found that variation could occur in the size of the cogging torque generated in the rotary electric machine 10 of each product, due to production errors in the first permanent magnet 50 and the second permanent magnet 52.

In an attempt to address the problem, in the embodiment of the present invention, the second flux barrier 47 is formed in each of the first slot 40 and the second slot 42, in addition to the first flux barrier 46. The second flux barrier 47 is formed to protrude from the inner long side of each of the first slot 40 and the second slot 42, and as viewed in the direction of from the rotation axis O of the rotor core 30, the outer circumferential wall 47a of the second flux barrier 47 is continuous with the first contact part 48a. By providing the second flux barrier 47 in addition to the first flux barrier 46, it is possible to reduce the cogging torque generated in the rotary electric machine 10, and suppress variation in the cogging torque in each product.

Further, by providing the first flux barrier 46 on outer circumferential short side of each of the first slot 40 and the second slot 42, it is possible to reduce the torque reduction amount of the rotary electric machine 10. However, as shown in the model A of FIG. 3, in the case of providing the first flux barrier 46 over the entire outer circumferential short side, the stress concentration value in the vicinity of the outer circumferential short side of each of the first slot 40 and the second slot 42 is increased.

In an attempt to address the problem, in the embodiment of the present invention, as viewed in the direction of the rotation axis O of the rotor core 30, the first flux barrier 46 is formed in the intermediate portion of the outer circumferential short side of each of the first slot 40 and the second slot 42. In this manner, by providing the first flux barrier 46, it is possible to suppress the torque reduction amount of the rotary electric machine 10, and suppress increase in the stress concentration value in the vicinity of the outer circumferential short side of each of the first slot 40 and the second slot 42.

Further, since it is possible to suppress increase in the stress concentration value in the vicinity of the outer circumferential short side in each of the first slot 40 and the second slot 42, it is possible to reduce the strength in the vicinity of the outer circumferential short side of each of the first slot 40 and the second slot 42. Therefore, it is possible to reduce the thickness from the outer circumferential ends of the first slot 40 and the second slot 42 up to the outer diameter of the rotor core 30, and suppress increase in the radial size of the rotor core 30.

Further in the embodiment of the present invention, as viewed in the direction of the rotary axis O of the rotor core 30, the first flux barrier 46 is arranged in a manner that the length of the first contact part 48a becomes larger than the length of the second contact part 48b. In this manner, it is possible to reduce the stress concentration value in the vicinity of the outer circumferential short side of each of the first slot 40 and the second slot 42 to a greater extent. Therefore, by providing the first flux barrier 46, it is possible to suppress reduction in the torque, and avoid increase in the radial size of the rotor core 30. Further, it is possible reduce the cogging torque, and enable the rotary electric machine 10 to rotate smoothly.

Further, in the embodiment of the present invention, the first permanent magnet 50 is inserted into the first slot 40 and the second permanent magnet 52 is inserted into the second slot 42, and as viewed in the direction of the rotation axis O of the rotor core 30, the communication part 44 is formed by connecting the end points P1, P1 of the inner circumferential short sides of the first slot 40 and the second slot 42 that are closer to each other, and connecting the end points P2, P2 of the inner circumferential short sides of the first slot 40 and the second slot 42 that are remoter from each other. In this manner, it is possible to achieve structure where the entire side surfaces on the inner circumferential side of the first permanent magnet 50 and the second permanent magnet 52 do not contact the rotor core 30. Thus, it is possible to reduce leakage of the magnetic flux.

Further, in the embodiment of the present invention, as viewed in the direction of the rotation axis O of the rotor core 30, the communication part 44 has a substantially isosceles trapezoidal shape. As viewed in the direction of the rotary axis O of the rotor core 30, the side surface 44a of the communication part 44 has a straight shape or a circular arc shape around the rotation axis O, and the side surface 44a is substantially in parallel with the inner circumferential surface of the shaft insertion hole 32. In this manner, in the rotor core 30, it is possible to ensure that the rotor shaft 34 has the desired shrink fitting margin.

Further, in the embodiment of the present invention, the inner circumferential short sides 50a, 52a of the first permanent magnet 50 and the second permanent magnet 52 are aligned with the inner circumferential short sides of the first slot 40 and the second slot 42. In the structure, the first permanent magnet 50 and the second permanent magnet 52 contact the end points P2 of the first slot 40 and the second slot 42. Therefore, it is possible to position the first permanent magnet 50 and the second permanent magnet 52 with respect to the first slot 40 and the second slot 42. Further, it is possible to reduce the length of slot 36 in the radial direction of the rotor core 30, and reduce the radial size of the rotor core 30.

Further, in the embodiment of the present invention, resin is filled in the first slot 40, the second slot 42, the communication part 44, the first flux barrier 46, and the second flux barrier 47. In this manner, it is possible to fix the first permanent magnet 50 and the second permanent magnet 52 in the first slot 40 and the second slot 42, respectively.

Modified Embodiment 1

In the first embodiment, the first slot 40 and the second slot 42 are remote from each other at the end points P1, P1.

Figure 7:
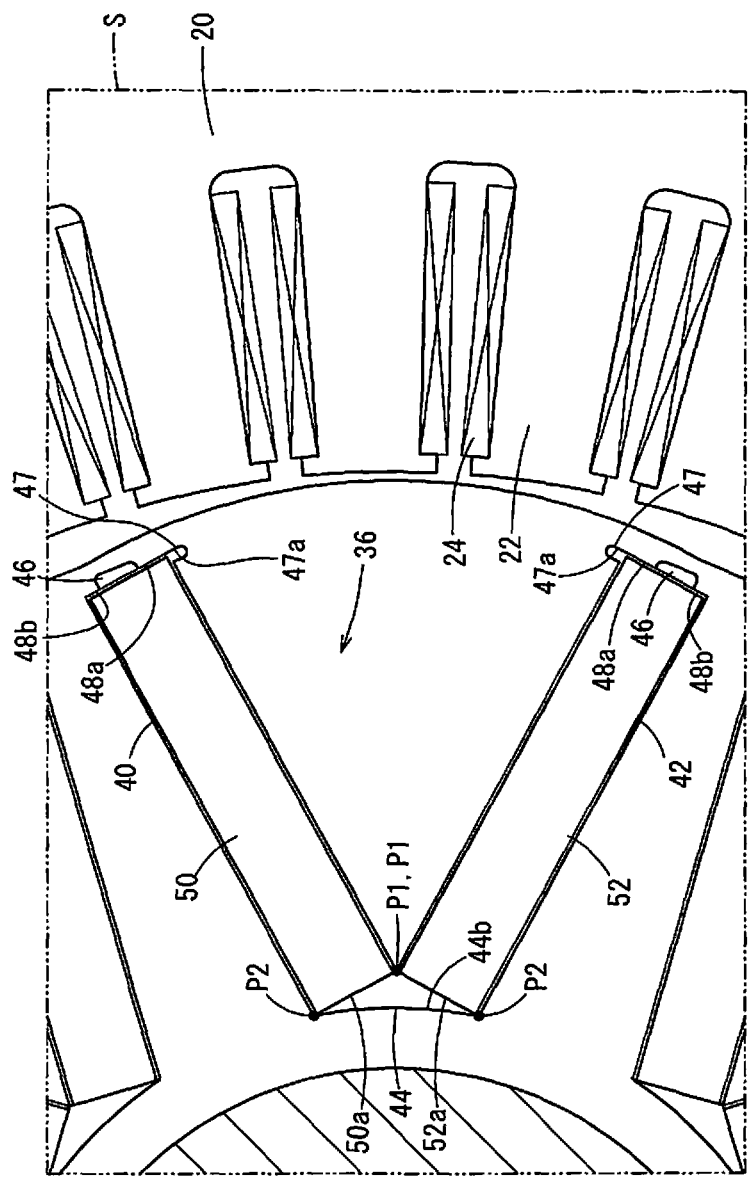
FIG. 7 is an enlarged view showing an area of a rectangular frame in FIG. 1.

Alternatively, the first slot 40 and the second slot 42 may contact each other at the end points P1, P1. FIG. 7 is an enlarged view showing an area of a rectangular frame S in FIG. 1. In FIG. 7, as viewed in the direction of the rotation axis O of the rotor core 30, the communication part 44 is formed to have a substantially isosceles triangle shape. At this time, as viewed in the direction of the rotation axis O of the rotor core 30, a substantially isosceles triangular space is formed by a side surface 44b connecting the end points P2, P2 of the communication part 44 and the inner circumferential short sides 50a, 52a of the first permanent magnet 50 and the second permanent magnet 52.

Modified Example 2

In the first embodiment, as viewed in the direction of the rotation axis O of the rotor core 30, the length of the first permanent magnet 50 and the second permanent magnet 52 and the length of the first slot 40 and the second slot 42 are substantially the same. Alternatively, the first permanent magnet 50 and the second permanent magnet 52 may be formed to be shorter than the first slot 40 and the second slot 42.

Modified Embodiment 3

In the first embodiment, the second flux barrier 47 is formed in a manner that the length La of the second flux barrier 47 protruding from each of the first slot 40 and the second slot 42 is larger than length Lb of the second flux barrier 47 in the axial direction. Alternatively, the second flux barrier 47 may be formed in a manner that the length La becomes smaller than the length Lb.

Technical Concept Derived from the Embodiments

The technical concepts which can be understood from the above embodiments of the present invention will be described below.

The rotor (14) includes: the rotor core (30) configured to rotate together with the rotor shaft (34); the first slot (40) and the second slot (42) penetrating through the rotor core (30), in the direction of the rotation axis (O) of the rotor core (30), and as viewed in the direction of the rotation axis (O) of the rotor core (30), the first slot (40) and the second slot (42) each having a substantially rectangular shape, and provided in a V-shape pattern in a manner that outer circumferential sides of the first slot (40) and the second slot (42) are positioned remotely from each other, and inner circumferential sides of the first slot (40) and the second slot (42) are positioned closely to each other; the first permanent magnet (50) and the second permanent magnet (52), as viewed in the direction of the rotation axis (O) of the rotor core (30), the first permanent magnet (50) and the second permanent magnet (52) each having a substantially rectangular shape, the first permanent magnet (50) being inserted into the first slot (40), and the second permanent magnet (52) being inserted into the second slot (42); the first contact part (48a), as viewed in the direction of the rotation axis (O) of the rotor core (30), the first contact part (48a) being formed in an outer circumferential short side of each of the first slot (40) and the second slot (42), and formed inside each of the first slot (40) and the second slot (42), to contact each of the first permanent magnet (50) and the second permanent magnet (52); the second contact part (48b), as viewed in the direction of the rotation axis (O) of the rotor core (30), the second contact part (48b) being formed in the outer circumferential short side of each of the first slot (40) and the second slot (42), and formed outside each of the first slot (40) and the second slot (42), to contact each of the first permanent magnet (50) and the second permanent magnet (52); the first flux barrier (46), as viewed in the direction of the rotation axis (O) of the rotor core (30), the first flux barrier (46) being provided between the first contact part (48a) and the second contact part (48b), and the first flux barrier (46) being formed in the outer circumferential short side of each of the first slot (40) and the second slot (42), to protrude toward an outer circumferential side; and the second flux barrier (47), as viewed in the direction of the rotation axis (O) of the rotor core (30), the outer circumferential wall (47a) of the second flux barrier (47) being continuous with the first contact part (48a), and the second flux barrier (47) being formed to protrude from an inner long side of each of the first slot (40) and the second slot (42). In the structure, it is possible to reduce the cogging torque generated in the rotary electric machine (10), and suppress variation in the cogging torque in each product.

In the rotor (14), the length (La) of the second flux barrier (47) in a direction protruding from the inner long side of each of the first slot (40) and the second slot (42) may be larger than the length (Lb) of the second flux barrier (47) in a width direction. In the structure, it is possible to reduce the cogging torque generated in the rotary electric machine (10), and suppress variation in the cogging torque in each product.

In the rotor (14), as viewed in the direction of the rotation axis (O) of the rotor core (30), the length of the first contact part (48a) may be larger than the length of the second contact part (48b). In the structure, it is possible to suppress torque reduction by reducing leakage of the magnetic flux using the first flux barrier (46), and suppress increase in the radial size of the rotor core (30). Further, it is possible to reduce the cogging torque, and enable the rotary electric machine (10) to rotate smoothly.

The rotor (14) may include the communication part (44) penetrating through the rotor core (30) in the direction of the rotation axis (O), and configured to connect inner circumferential portions of the first slot (40) and the second slot (42). In the structure, it is possible to achieve structure where the entire inner circumferential side surface of the first permanent magnet (50) and the entire inner circumferential side surface of the second permanent magnet (52) do not contact the rotor core (30). Thus, it is possible to reduce leakage of the magnetic flux.

In the rotor (14), as viewed in the direction of the rotation axis (O) of the rotor core (30), the communication part (44) may have a shape formed by connecting end points (P1, P1) that are closer to each other, and end points (P2, P2) that are remoter from each other, among end points of inner circumferential short sides of the first slot (40) and the second slot (42). In the structure, it is possible to achieve structure where the entire inner circumferential side surface of the first permanent magnet (50) and the entire inner circumferential side surface of the second permanent magnet (52) do not contact the rotor core (30). Thus, it is possible to reduce leakage of the magnetic flux.

In the rotor (14), as viewed in the direction of the rotation axis (O) of the rotor core (30), the communication part (44) may have a substantially triangular shape or a substantially trapezoidal shape. In the structure, in the rotor core (30), it is possible to ensure that the rotor shaft (34) has the desired shrink fitting margin.

In the rotor (14), an inner circumferential' short side of the first permanent magnet (50) may be aligned with an inner circumferential short side of the first slot (40), and an inner circumferential short side of the second permanent magnet (52) may be aligned with an inner circumferential short side of the second slot (42). In this manner, the first permanent magnet (50) and the second permanent magnet (52) contact the end points (P2) of the first slot (40) and the second slot (42), and it is possible to position the first permanent magnet (50) and the second permanent magnet (52) with respect to the first slot (40) and the second slot (42). Further, it is possible to reduce the length of the slot (36) in the radial direction of the rotor core (30), and reduce the diameter of the rotor core (30).

In the rotor (14), resin may be filled in the first flux barrier (46), the second flux barrier (47), and the communication part (44). In the structure, the first permanent magnet (50) and the second permanent magnet (52) can be fixed in the first slot (40) and the second slot (42).

The rotary electric machine (10) includes the above rotor (14). In the structure, it is possible to reduce the cogging torque generated in the rotary electric machine (10), and suppress variation in the cogging torque in each product.

While the invention has been particularly shown and described with reference to the preferred embodiments, it will be understood that variations and modifications can be effected thereto by those skilled in the art without departing from the scope of the invention as defined by the appended claims.

What is claimed is:

1. A rotor comprising:
   a rotor core configured to rotate together with a rotor shaft;
   a first slot and a second slot penetrating through the rotor core, in a direction of a rotation axis of the rotor core, and as viewed in the direction of the rotation axis of the rotor core, the first slot and the second slot each having a substantially rectangular shape, and provided in a V-shape pattern in a manner that outer circumferential sides of the first slot and the second slot are positioned remotely from each other, and inner circumferential sides of the first slot and the second slot are positioned closely to each other;
   a first permanent magnet and a second permanent magnet, as viewed in the direction of the rotation axis of the rotor core, the first permanent magnet and the second permanent magnet each having a substantially rectangular shape, the first permanent magnet being inserted into the first slot, and the second permanent magnet being inserted into the second slot;
   a first contact part, as viewed in the direction of the rotation axis of the rotor core, the first contact part being formed in an outer circumferential short side of each of the first slot and the second slot, and forms the boundary of each of the first slot and the second slot, to contact each of the first permanent magnet and the second permanent magnet;
   a second contact part, as viewed in the direction of the rotation axis of the rotor core, the second contact part being formed in the outer circumferential short side of each of the first slot and the second slot, and forms the boundary of each of the first slot and the second slot, to contact each of the first permanent magnet and the second permanent magnet;
   a first flux barrier, as viewed in the direction of the rotation axis of the rotor core, the first flux barrier being provided between the first contact part and the second contact part, and the first flux barrier being formed in the outer circumferential short side of each of the first slot and the second slot, to protrude toward an outer circumferential side; and
   a second flux barrier, as viewed in the direction of the rotation axis of the rotor core, an outer circumferential wall of the second flux barrier being continuous with the first contact part, and the second flux barrier being formed to protrude from an inner long side of each of the first slot and the second slot, wherein a length of the second flux barrier in a direction protruding from the inner long side of each of the first slot and the second slot is larger than a length of the second flux barrier in a width direction.

2. A rotor comprising:
   a rotor core configured to rotate together with a rotor shaft;
   a first slot and a second slot penetrating through the rotor core, in a direction of a rotation axis of the rotor core, and as viewed in the direction of the rotation axis of the rotor core, the first slot and the second slot each having a substantially rectangular shape, and provided in a V-shape pattern in a manner that outer circumferential sides of the first slot and the second slot are positioned remotely from each other, and inner circumferential sides of the first slot and the second slot are positioned closely to each other;
   a first permanent magnet and a second permanent magnet, as viewed in the direction of the rotation axis of the rotor core, the first permanent magnet and the second permanent magnet each having a substantially rectangular shape, the first permanent magnet being inserted into the first slot, and the second permanent magnet being inserted into the second slot;
   a first contact part, as viewed in the direction of the rotation axis of the rotor core, the first contact part being formed in an outer circumferential short side of each of the first slot and the second slot, and forms the boundary of each of the first slot and the second slot, to contact each of the first permanent magnet and the second permanent magnet;
   a second contact part, as viewed in the direction of the rotation axis of the rotor core, the second contact part being formed in the outer circumferential short side of each of the first slot and the second slot, and forms the boundary of each of the first slot and the second slot, to contact each of the first permanent magnet and the second permanent magnet;
   a first flux barrier, as viewed in the direction of the rotation axis of the rotor core, the first flux barrier being provided between the first contact part and the second contact part, and the first flux barrier being formed in the outer circumferential short side of each of the first slot and the second slot, to protrude toward an outer circumferential side; and
   a second flux barrier, as viewed in the direction of the rotation axis of the rotor core, an outer circumferential wall of the second flux barrier being continuous with the first contact part, and the second flux barrier being formed to protrude from an inner long side of each of the first slot and the second slot, wherein, as viewed in the direction of the rotation axis of the rotor core, a length of the first contact part is larger than a length of the second contact part.

3. The rotor according to claim 2, comprising a communication part penetrating through the rotor core in the direction of the rotation axis, and configured to connect inner circumferential portions of the first slot and the second slot.

4. The rotor according to claim 3, wherein, as viewed in the direction of the rotation axis of the rotor core, the communication part has a shape formed by connecting end points that are closer to each other, and end points that are remoter from each other, among end points of inner circumferential short sides of the first slot and the second slot.

5. The rotor according to claim 4, wherein, as viewed in the direction of the rotation axis of the rotor core, the communication part has a substantially triangular shape or a substantially trapezoidal shape.

6. The rotor according to claim 4, wherein an inner circumferential short side of the first permanent magnet is substantially aligned with the inner circumferential short side of the first slot; and an inner circumferential short side of the second permanent magnet is substantially aligned with the inner circumferential short side of the second slot.

7. The rotor according to claim 3, wherein resin is filled in the first flux barrier, the second flux barrier, and the communication part.

8. A rotary electric machine comprising the rotor according to claim 2.

* * * * *